US005839183A

United States Patent [19]

Powlett

[11] Patent Number: 5,839,183

[45] Date of Patent: Nov. 24, 1998

[54] PUNCH RETAINER

[75] Inventor: Michael J. Powlett, Stratford-Upon Avon, England

[73] Assignee: Porter Precision Products Co., Cincinnati, Ohio

[21] Appl. No.: 851,183

[22] Filed: May 5, 1997

Related U.S. Application Data

[62] Division of Ser. No. 717,756, Sep. 23, 1996.

[51] Int. Cl.[6] .............................. B23Q 3/00; B23P 19/02; B26F 1/14

[52] U.S. Cl. .......................... 29/464; 29/525; 29/525.11; 83/698.91; 83/698.71

[58] Field of Search ............................ 83/698.91, 698.71, 83/686, 687, 13; 29/464, 525, 525.11

[56] References Cited

U.S. PATENT DOCUMENTS

D. 346,174 4/1994 Stroh .
826,130 7/1906 Vold .
1,322,525 11/1919 Bowers .
1,569,136 1/1926 Pardee, Jr. .
1,995,466 3/1935 Bishop .
2,387,027 10/1945 Jackson .
2,655,995 10/1953 Whistler .
2,997,907 8/1961 Constantino .
3,103,845 9/1963 Porter et al. .
3,106,122 10/1963 Newcomb .
3,126,776 3/1964 Whistler, Sr. et al. .
3,137,193 6/1964 Whistler, Sr. et al. .
3,496,822 2/1970 Nuckols et al. .
3,563,124 2/1971 Gargrave ............................ 83/698.91
3,693,247 9/1972 Brown ...................................... 29/525
3,702,085 11/1972 Hicok .................................... 29/524.1
3,747,196 7/1973 Whittington ........................ 29/525.11
4,103,574 8/1978 Greer .
4,339,976 7/1982 Wallis .
5,038,599 8/1991 Wellman .
5,052,096 10/1991 Fuller et al. ............................. 29/525
5,088,180 2/1992 Nottingham et al. ..................... 29/525
5,256,019 10/1993 Phillips, II .......................... 29/525.11
5,284,069 2/1994 Wellman .
5,357,835 10/1994 Moellering .

*Primary Examiner*—M. Rachuba
*Assistant Examiner*—Sean A. Pryor
*Attorney, Agent, or Firm*—Wood, Herron & Evans

[57] ABSTRACT

A punch retainer which, in one preferred form, includes at least one bolt head seat formed in the retainer's body for receiving a bolt by which the retainer is fixed to a punch press's mounting plate. The seat is defined in the retainer's bottom face adjacent a peripheral side wall, and a section of the peripheral side wall is removed from the retainer's body to provide access to the seat in a direction generally parallel to the plane of the retainer's bottom face. The punch retainer, in another preferred form, includes a backing plate and a body. A method of assembling this latter punch retainer with a punch press' mounting plate includes press fitting a registration dowel in assembled relation with the retainer's backing plate and body in a tight press fit relation so as to connect firmly the backing plate with the body. If a piercing punch with a circular shaped nib is selected for use with the retainer, that registration dowel can simply be driven wholly into the retainer while maintaining the interconnection between the retainer's backing plate and body. If a piercing punch with an irregular shaped nib is selected for use with the retainer, then the registration dowel is kept extended from the retainer's backing plate for interfit with a registration hole in the press' mounting plate. This method prevents the need for welding or adhering or bolting or otherwise connecting the retainer's backing plate with the retainer's body, and the registration dowel provides a double function when a punch with irregular shaped nib is selected for use.

6 Claims, 1 Drawing Sheet

PUNCH RETAINER

This application is a divisional of application Ser. No. 08/717,756, filed on Sep. 23, 1996 pending.

This invention relates to punch presses. More particularly, this invention relates to punch retainers adapted for use with punch presses.

Punch retainers are very well known to the prior art. In use, a piercing punch is carried in a punch retainer which, in turn, is connected with a punch press' mounting plate, thereby interconnecting the piercing punch with the punch press. Also well known to the prior art are punch retainers with hardened backing plates. The hardened backing plate bears directly against the non-piercing end of the punch to absorb the shock and stress of each punch stroke. It is known to permanently connect the retainer's backing plates to the retainer's body through use of bolts, see U.S. Pat. No. 3,103,845, and through use of welding or riveting or adhesives or chemical bonding, see U.S. Pat. No. 5,284,069. All of such prior art punch retainers make use of dowel pins for the purpose of properly aligning the punch retainer on the punch press' mounting plate. In all of such prior art, the retainer's backing plate is first permanently connected with the retainer's body, and separately the alignment dowel pins are thereafter interconnected with the retainer's backing plate.

Prior art punch retainers, as to those retainers available in the marketplace, are connected with the punch press' mounting plate through use of cap screws. These cap screws are inserted through the retainer's body and backing plate from the retainer's bottom face up through the body and the backing plate into the punch press' mounting plate, and are threaded thereinto until the caps or bolt heads of same are snugged up against bolt head seats recessed into the retainer's body. These-recessed bolt head seats of the prior art, as illustrated, e.g., in U.S. Pat. Nos. 3,103,845 and 5,284,069, are located wholly interiorly of the retainer's peripheral side wall. And so access to the recessed bolt head seats in the retainers only can be achieved axially of the cap screw bores established in the retainer's body for receiving those cap screws.

Accordingly, it has been one objective of this invention to provide a novel method for assembling a punch retainer with a mounting plate where that punch retainer includes a backing plate, that method including connecting the retainer's backing plate and the retainer's body through use of at least a registration dowel installed in tight press fit relation with the backing plate and the body. The registration dowel, when a piercing punch with a circular shaped nib is selected for use with the retainer, may be driven into the punch retainer's backing plate and body assembly until it does not extend above the retainer's top face, all while retaining the fixed connection of the backing plate with the body. Alternatively, when a piercing punch with an irregular shaped nib is selected for use, the registration dowel remains connected with the retainer in an assembled attitude where the dowel extends partially above the backing plate so as to interfit with a registration hole in the punch press' mounting plate. In preferred form, also provided is a connector dowel which is tightly press fit between the retainer's backing plate and body in a separate connector dowel bore so as to aid in providing a tight connection of the backing plate with the body.

Another objective of this invention has been to provide an improved punch retainer with a side accessible bolt head seat so as to permit access to the mounting bolt head in a direction generally parallel to the plane of the retainer's bottom face as well as in a direction generally coaxial with the mounting bolt bore formal in the retainer's body. In preferred form, this is achieved by forming at least one bolt head seat in the body's bottom face adjacent the retainer's peripheral side wall with a section of that peripheral side wall being removed from the body. This provides access through that side wall section removed to that bolt head seat in a direction generally parallel to the plane of the bottom face.

Other objectives and advantages of this invention will be more apparent from the following detailed description taken in conjunction with the drawings in which.

Figure 1:
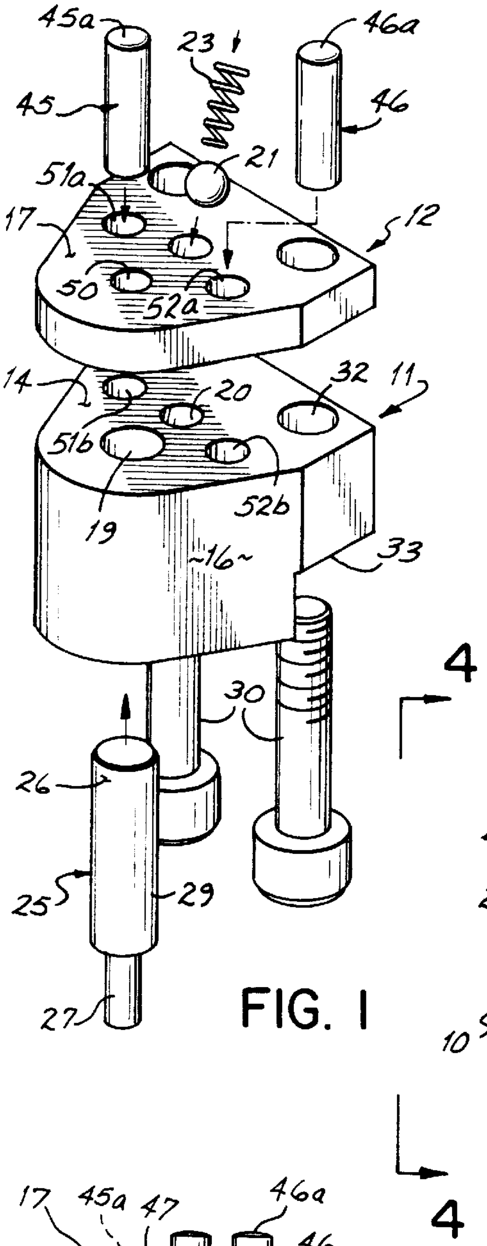
FIG. 1 is a top exploded perspective view illustrating the components of a punch retainer in accord with the principles of this invention.
Figure 2:
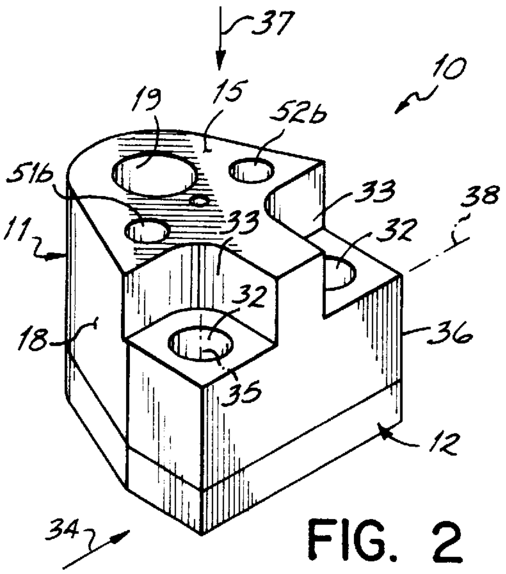
FIG. 2 is a bottom perspective view of the punch retainer by itself without a piercing punch or mounting bolts assembled therewith.
Figure 3:
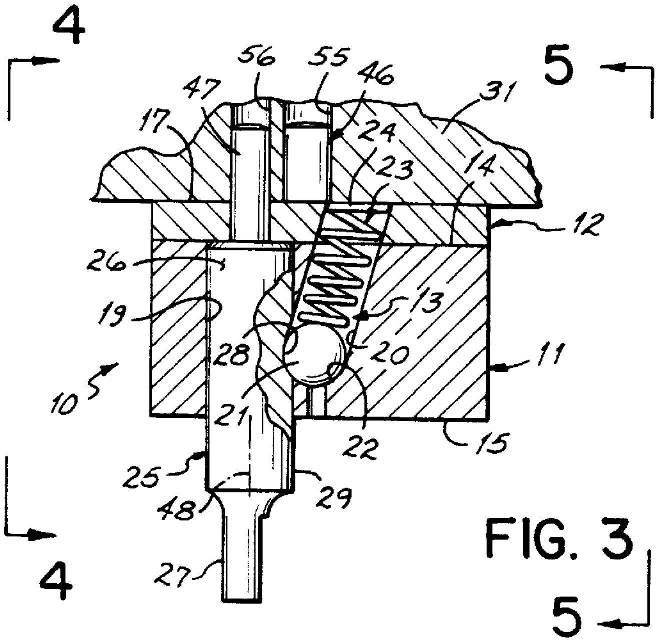
FIG. 3 is a side elevation cross-sectional view showing a punch retainer in accord with the principles of this invention assembled with a piercing punch and with a punch press' mounting plate.
Figure 5:
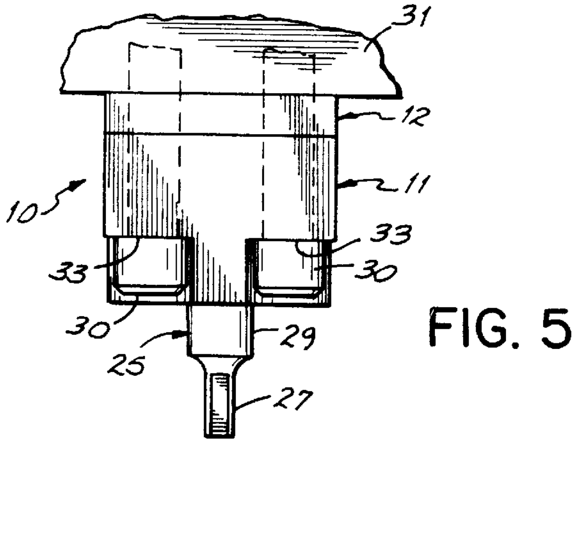
FIG. 5 is a rear view of the punch retainer in assembly with the punch press' mounting plate and taken along line 5—5 of FIG. 3.

The basic components of a punch retainer 10 in accord with the principles of this invention are illustrated in FIG. 1. These basic components include a retainer body 11, a backing plate 12, and a punch latch 13. The retainer's body 11 is defined by a top face 14, a bottom face 15, and a peripheral side wall 16. The body 11 with the backing plate 12 in assembly, i.e., the retainer 10, as shown in FIG. 2, includes a top face 17, the bottom face 15, and a peripheral side wall 18. The retainer 10 includes a latch bore 20 which extends into the retainer's body 11 through the retainer's backing plate 12 as shown in FIG. 3. The punch latch 13 includes a ball 21 received in seat 22 at the inner end of the latch bore 20, and a compression spring 23 disposed in the latch bore 20 for continuously biasing the ball toward that seat 22. The compression spring 23 is held in assembly with the retainer 10 by virtue of its oversized free end 24 which is tightly press fitted within that section of the latch bore 20 defined by the backing plate 12. The punch retainer 10 also includes a punch bore 19 defined in the retainer's body 11. That punch bore 19 extends into the body 11 from the retainer's bottom face 15. The punch bore 19 is adapted to receive a piercing punch 25 with the punch's shank end 26 being bottomed out against the retainer's backing plate 12. The piercing punch 25 may have a nib 27 with a circular cross section (not shown) or with an irregular cross section as shown in FIG. 5. The piercing punch 25 includes a surface depression 28 formed in its shank 29 which cooperates with the spring 23 loaded ball 21 to latch the piercing punch 25 in assembly with the retainer's body 11.

Two mounting bolts 30 cooperate with the punch retainer 10 for connecting the retainer to a punch press' mounting plate 31, see FIGS. 1, 3 and 5. Mounting bolt bores 32 are provided in the retainer 10 to receive the mounting bolts 30, these bores 32 extending through the retainer's body 11 and through the retainer's backing plate 12. A bolt head seat 33 is formed in the retainer's body 11 which cooperates with each bolt bore 32, the bolt bore being generally centrally located relative to the bolt head seat. The bolt head seat 33 is defined in the retainer body's bottom face 15 at the body's peripheral side wall 16. More specifically in this regard, a section of the body's peripheral side wall 16 is removed from the body 11 to provide access to the bolt head seat 33 in a direction 34 generally parallel to the plane of the retainer's bottom face 15. Note particularly this access to the bolt head seat 33 in a direction 34 generally parallel to the plane of the bottom face 15 is provided throughout at least about 180° relative to the longitudinal axis 35 of the bolt bore 32. Note further this bolt head seat 33 is located at a generally right angle comer 36 of the retainer's peripheral side wall 18. Accordingly, not only is the bolt head seat 33 accessible in a direction 37 generally co-axial with the longitudinal axis 35 of the bolt bore 32, but it is also accessible in the plane 38 of the bolt head seat itself in a direction 34 generally normal to the axis of the bolt bore. Such access enhances the ease of assembling the punch retainer 10 with, and disassembling the punch retainer from, a punch press' mounting plate 31.

In the punch retainer 10 of this invention, the retainer's backing plate 12 is held in fixed assembly with the retainer's body 11 by use of a connector dowel 45 and a registration dowel 46 which are each received in tight press fit relation with both the backing plate and the body. The punch retainer 10 is located on the punch press' mounting plate 31 through use of a datum dowel 47 and, depending on the kind of nib 27 on the piercing punch 25, the registration dowel 46. This connector dowel 45, registration dowel 46, datum dowel 47 system accommodates a novel method by which the registration dowel can play a double function, namely, (a) it aids in fixedly connecting the retainer's backing plate 12 to the retainer's body 11 and (b) it aids in properly orienting the retainer 10 on the punch press' mounting plate 31 when the punch 25 has an irregularly shaped nib 27. Alternatively, and when the punch retainer 10 mounts a piercing punch 25 with a circular shaped nib 27, the registration dowel 46 provides only that function of connecting the retainer's backing plate 12 with the retainer's body 11. So this system is operational regardless of whether the punch 25 has a round nib or an irregularly shaped nib 27 (i.e., anything other than round). In other words, the system is directed to making sure the punch retainer 10 is properly located or positioned on the punch press' mounting plate 31 relative to the punch axis 48 if the punch nib 27 is of an irregular configuration, while simultaneously providing a tight press fit means by which the backing plate 12 is firmly connected to the body 11; if the punch nib is of a round configuration, it does not matter how the retainer is rotationally located on the mounting plate as long as the punch axis is properly positioned on that mounting plate.

Now there are three dowel holes which are visible from the top face 17 of the punch retainer 10, namely, datum dowel hole 50, connector dowel hole 51*a* and 51*b* and registration dowel hole 52*a* and 52*b*. These dowel holes 50, 51*a* and 52*a* all extend through the backing plate 12, and the connector dowel hole 51*b* and the registration dowel hole 52*b* also extending into the body 11. The datum dowel hole 50 is centered over, i.e., is coaxial with, the punch bore 19 in the retainer's body 11. The datum dowel pin 47 received in this datum dowel hole 50 properly locates the punch 25 on the press' mounting plate 31 because it is co-axial with the punch bore 19 in the retainer's body 11, see FIG. 3.

The connector dowel 45 is tightly press fit into the connector dowel hole 51*a* in the backing plate 12 and into the associated connector dowel hole 51*b* in the retainer body 11. This results in a tight press fit connection of the connector dowel 45 with both the backing plate 12 and the body 11, thereby firmly connecting the backing plate to the body to form the one-piece retainer 10 assembly. Note, as particularly shown in FIG. 4, that upon assembly and during use the connector dowel 45 is press fit so that it's top end 45*a* is recessed no higher than the top face 17 of the retainer 10, i.e., no higher then level with the backing plate's exposed surface.

Figure 4:
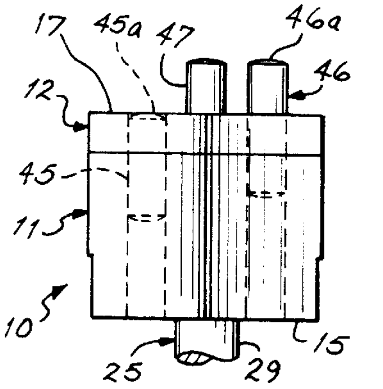
FIG. 4 is a front view of the punch retainer in assembly with the punch press' mounting plate, and taken along line 4—4 of FIG. 3.

The registration dowel 46 is also tightly press fit into the registration dowel hole 52*a* in the backing plate and into the associated registration dowel hole 52*b* in the retainer's body 11. This also results in a tight press fit connection of the registration dowel 46 with both the backing plate 12 and the body 11, thereby also firmly connecting the backing plate to the body to form a one piece retainer assembly. But as shown in FIG. 4, the registration dowel 46 is preliminarily press fit through the backing plate's registration dowel hole 52*a* and only partly into the retainer body's registration dowel hole 52*b* so that it, in an initial assembly step, extends substantially above the retainer's backing plate, i.e., above the retainer's top face 17, as shown in FIG. 4. This is the as-shipped configuration of the retainer 10 from manufacturer to end user. Now when the retainer 10 is to be used with a punch 25 having an irregularly shaped punch nib 27, i.e., a punch where it is important to rotationally position the retainer on the press' mounting plate 31 accurately relative to the axis 48 of the punch, then the registration dowel 46 is left in the upraised position illustrated in FIG. 4. And in this upraised position, the registration dowel 46 cooperates with a registration dowel bore 55 in the mounting plate 31, and the datum dowel 47 cooperates with a datum dowel bore 56 in the mounting plate, to accurately locate the punch retainer 10 in assembly with the punch press' mounting plate when connected thereto by bolts 30, see FIGS. 3 and 5. Such a two point, i.e., a datum dowel 47 point and a registration dowel 46 point, orientation is required with a punch 25 having an irregularly shaped nib 27 to make sure that the irregularity of the nib is rotationally oriented to the proper location on the punch press' mounting plate 31. Alternatively, and when the punch nib 27 is of a circular configuration so that rotational orientation of the punch retainer 10 relative to the punch axis 48 on the press' mounting plate 31 is not important, prior to assembly of the punch retainer 10 with the mounting plate 31 the registration dowel 46 is simply hammered or otherwise inserted fully into the retainer's backing plate 12 so that the registration dowel 46 is recessed into the retainer to an extent where its top end 46*a* does not extend above the backing plate, i.e., to where its top end 46a is recessed so it is no higher than level with the retainer's top surface 17, as is the case with the connector dowel 45. In this latter configuration (not shown), the retainer 10 can be connected to the mounting plate 31 by mounting bolts 30 without regard to its rotational position relative to the punch's axis 48. In other words, this datum dowel 47, connector dowel 45, registration dowel 46 system can be used (a) with a round punch nib 27 where rotational orientation of the retainer 10 on the press' mounting plate 31 is not important because the datum dowel 47 establishes the punch 25 position by itself (and in this attitude, the registration dowel 46 may be pushed fully inside the retainer's backing plate 12 and body 11), or (b) with an irregularly shaped punch nib 27 where rotational orientation of the retainer on the press' mounting plate is important, and where the registration dowel 46 remains extended and is located in registration hole 52 in that retainer. So the registration dowel 46, in this feature of the invention, provides a double function when an irregularly shaped punch nib 27 is used, i.e, it cooperates with the connector dowel 45 to firmly fix the retainer's backing plate 12 and body 11 together, and it also provides a registration function in combination with the datum dowel 47 to properly orient the retainer 10 on the press' mounting plate 31 relative to the punch's axis 48.

Having described in detail the preferred embodiment of my invention, what I desire to claim and protect by Letters Patent is:

1. A method of assembling a punch retainer with a mounting plate, said punch retainer having a retainer body including a top face and a bottom face, a punch bore extending into said retainer body from said bottom face, a datum dowel hole extending into said retainer body from said top face and co-axially aligned with said punch bore, and a registration dowel hole extending into said retainer body from said top face, said punch bore being adapted to receive a piercing punch having a nib of circular shaped cross-section and also adapted to receive a piercing punch having a nib of an irregular shaped cross-section, said punch retainer having a backing plate, said backing plate defining said punch retainer's top face and said retainer body defining said punch retainer's bottom face, said method comprising the steps of locating a datum dowel in assembled relation with said datum dowel hole, said datum dowel extending partially above said retainer body's top face, forming said registration bore hole to extend from said backing plate into said retainer body, and inserting a piercing punch with circular shaped nib into said punch bore, press fitting a registration dowel into a relatively tight press fitted relation both with said backing plate and said retainer body, said registration dowel being so press fit when said retainer body is assembled with said mounting plate said registration dowel holds said backing plate and said body in assembled relation, and inserting said registration dowel entirely into said punch retainer so no portion of said registration dowel extends above said punch retainer's top face, and then assembling said punch retainer by locating said datum dowel in a datum dowel position bore formed in said mounting plate and by bolting said retainer to said mounting plate.

2. A method as set forth in claim 1, said retainer having a connector dowel hole extending into said retainer from said top face, said method comprising the steps of forming a connector bore hole extending from said backing plate into said body, and press fitting a connector dowel into a relatively tight press fitted relation both with said backing plate and said retainer body to aid in holding said backing plate and said retainer body in assembled relation.

3. A method as set forth in claim 2, said method comprising the step of inserting said connector dowel entirely into said punch retainer so no portion of said connector dowel extends above said retainer's top face.

4. A method of assembling a punch retainer with a mounting plate, said retainer having retainer body including a top face and a bottom face, a punch bore extending into said retainer from said bottom face, a datum dowel hole extending into said retainer body from said top face and co-axially aligned with said punch bore, and a registration dowel hole extending into said retainer from said top face, said punch bore being adapted to receive a piercing punch having a nib of circular shaped cross-section and also adapted to receive a piercing punch having a nib of an irregular shaped cross-section, said punch retainer having a backing plate, said backing plate defining said punch retainer's top face and said retainer body defining said punch retainer's bottom face, said method comprising the steps of locating a datum dowel in assembled relation with said datum dowel hole, said datum dowel extending partially above said retainer body's top face, forming said registration bore hole to extend from said backing plate into said retainer body, and inserting a piercing punch with an irregular shaped nib, for use with said retainer, press fitting a registration dowel into a relatively tight press fitted relation both with said backing plate and said retainer body, said registration dowel being so press fit when said retainer body is assembled with said mounting plate, said registration dowel holds said backing plate and said retainer body in assembled relation, assembling said punch retainer with said mounting plate by locating said datum dowel hole in a datum dowel position bore formed in said mounting plate, by locating said registration dowel in a registration dowel position bore formed in said mounting plate, and by bolting said retainer to said mounting plate.

5. A method as set forth in claim 4, said retainer having a connector dowel hole extending into said retainer from said top face, said method comprising the steps of forming a connector bore hole partially in said backing plate and partially in said body, and press fitting a connector dowel into a relatively tight press fitted relation both with said backing plate and said body to aid in holding said backing plate and said body in assembled relation.

6. A method as set forth in claim 4, said method comprising the step of inserting said connector dowel entirely into said punch retainer so no portion of said connector dowel extends above said retainer's top face.

* * * * *